United States Patent
Wu et al.

(10) Patent No.: US 9,790,835 B1
(45) Date of Patent: Oct. 17, 2017

(54) CATALYST FAILURE DETECTION BASED COMBINED AMMONIA TO NOX RATIOS, CONVERSION INEFFICIENCY VALUES AND AMMONIA SLIP VALUES

(71) Applicant: Cummins Emission Solutions Inc., Columbus, IN (US)

(72) Inventors: An Wu, Columbus, IN (US); Michael Haas, Columbus, IN (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 1 day.

(21) Appl. No.: 15/137,393

(22) Filed: Apr. 25, 2016

(51) Int. Cl.
- *G01N 31/10* (2006.01)
- *F01N 11/00* (2006.01)
- *F01N 3/20* (2006.01)

(52) U.S. Cl.
CPC .......... *F01N 11/007* (2013.01); *F01N 3/208* (2013.01); *F01N 2550/02* (2013.01)

(58) Field of Classification Search
CPC ....................................................... G01N 31/10
USPC ................................................... 436/37, 116
See application file for complete search history.

(56) References Cited

U.S. PATENT DOCUMENTS

| | | | |
|---|---|---|---|
| 6,925,796 B2 | 8/2005 | Nieuwstadt et al. | |
| 8,590,290 B2 | 11/2013 | Yezerets et al. | |
| 8,869,607 B2 | 10/2014 | Levijoki et al. | |
| 2009/0272099 A1* | 11/2009 | Garimella | F01N 3/208 60/277 |
| 2010/0024393 A1* | 2/2010 | Chi | F01N 3/208 60/276 |
| 2010/0043400 A1* | 2/2010 | Wang | F01N 3/2066 60/276 |
| 2010/0101214 A1 | 4/2010 | Herman et al. | |
| 2010/0107609 A1* | 5/2010 | Parmentier | B01D 53/90 60/286 |
| 2010/0242440 A1* | 9/2010 | Garimella | B01D 53/9409 60/276 |
| 2011/0131956 A1* | 6/2011 | Yasui | F01N 3/206 60/277 |
| 2011/0219747 A1* | 9/2011 | Geveci | F01N 3/208 60/274 |
| 2011/0239628 A1* | 10/2011 | Tanioka | F01N 3/208 60/276 |
| 2012/0017567 A1* | 1/2012 | Geveci | F01N 3/208 60/274 |
| 2012/0067028 A1* | 3/2012 | Clerc | F01N 3/208 60/274 |

(Continued)

Primary Examiner — Arlen Soderquist
(74) Attorney, Agent, or Firm — Foley & Lardner LLP

(57) ABSTRACT

Implementations of systems and methods for detecting the failure of an selective catalytic reduction (SCR) catalyst may include a controller or one or more circuits for acquiring an ammonia to NOx ratio (ANR) value for exhaust gas flowing through an exhaust system, acquiring a conversion inefficiency value indicative of a conversion inefficiency of the SCR catalyst, acquire an $NH_3$ slip value indicative of an amount of $NH_3$ slip through the exhaust system downstream of the SCR catalyst, calculate a combined ANR/conversion inefficiency/NH3 slip (ACN) value based on the ANR value, conversion inefficiency value, and $NH_3$ slip value, and indicating a failure of the SCR catalyst responsive to the calculated ACN value exceeding a predetermined threshold value.

25 Claims, 6 Drawing Sheets

(56) References Cited

U.S. PATENT DOCUMENTS

| | | | | |
|---|---|---|---|---|
| 2012/0067114 A1* | 3/2012 | Clerc | ................. | G01M 15/102 73/114.75 |
| 2012/0085082 A1* | 4/2012 | Levijoki | ................. | F01N 3/208 60/274 |
| 2012/0085083 A1* | 4/2012 | Zayan | .................... | F01N 3/208 60/274 |
| 2012/0233986 A1* | 9/2012 | Geveci | .................... | F01N 3/208 60/274 |
| 2012/0270725 A1* | 10/2012 | Chen | ..................... | B01D 53/96 502/56 |
| 2014/0007559 A1* | 1/2014 | Janssen | .................. | F01N 11/00 60/276 |
| 2014/0033683 A1* | 2/2014 | Wei | ........................ | F01N 3/208 60/274 |
| 2014/0056790 A1* | 2/2014 | Geveci | .................... | F01N 3/208 423/212 |
| 2015/0226102 A1* | 8/2015 | Hsieh | ................. | B01D 53/9418 60/274 |
| 2015/0247435 A1* | 9/2015 | Garimella | ............... | F01N 3/208 60/274 |

* cited by examiner

CATALYST FAILURE DETECTION BASED COMBINED AMMONIA TO NOX RATIOS, CONVERSION INEFFICIENCY VALUES AND AMMONIA SLIP VALUES

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, or urea, is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system upstream of the catalyst chamber. The SCR system may include one or more sensors to monitor conditions within the exhaust system.

SUMMARY

Implementations described herein relate to systems and methods for detecting the failure of an SCR catalyst. If an SCR catalyst fails, then unwanted $NO_x$ emissions may be exhausted to atmosphere due to the decrease or cessation of the selective catalytic reduction process for the exhaust system. In some implementations, to increase the robustness of the testing for the failure of the SCR catalyst and/or to reduce potential false-positives for failed SCR catalysts, multiple parameters or signatures may be used to generate a composite value. For instance, the three parameters or signatures may include an ammonia to $NO_x$ ratio (ANR), a $deNO_x$ conversion inefficiency, and a $NH_3$ slip indicator. Each value for the ANR, $deNO_x$ conversion inefficiency, and $NH_3$ slip indicator can be multiplied together to form an aggregate value, such as a combined ANR/conversion inefficiency/NH3 slip (ACN) value, that can be used to indicate when the SCR catalyst has failed. When the ACN value exceeds a predetermined threshold value, the SCR catalyst can be determined to have likely failed. The use of the multiple parameters or signatures for the ACN value decreases the likelihood that a single outlier value for a parameter or signature will trigger the indication that the SCR catalyst has failed.

One implementation relates to a system that includes exhaust system having an SCR catalyst and a controller. The controller is configured to acquire an ANR value for exhaust gas flowing through the exhaust system, acquire a conversion inefficiency value indicative of a conversion inefficiency of the SCR catalyst, acquire an $NH_3$ slip value indicative of an amount of $NH_3$ slip through the exhaust system downstream of the SCR catalyst, calculate an ACN value based on the acquired ANR value, the acquired conversion inefficiency value, and the acquired $NH_3$ slip value, and indicate a failure of the SCR catalyst responsive to the calculated ACN value exceeding a predetermined threshold value.

In some implementations, the system also includes an $NH_3$ sensor positioned relative to the exhaust system to detect an amount of $NH_3$ slip downstream of at least a portion of the SCR catalyst and acquiring the $NH_3$ slip value is based on the detected amount of $NH_3$ slip by the $NH_3$ sensor. In some implementations, acquiring the ANR value includes acquiring a filtered value of an ANR parameter determined based on a feedback control algorithm of the controller. In some implementations, the system also includes a $NH_3$ sensor positioned relative to the exhaust system and acquiring the ANR value is based on a detected amount of $NH_3$ by the $NH_3$ sensor. In some implementations, the system also includes a $NO_x$ sensor positioned relative to the exhaust system and acquiring the ANR value is based on a detected amount of $NO_x$ by the $NO_x$ sensor. In some implementations, acquiring the conversion inefficiency value includes acquiring an actual conversion efficiency value for the SCR catalyst and an estimated target conversion efficiency value for the SCR catalyst. The conversion inefficiency value may be calculated by:

$$C = \left(1 - \frac{CE}{CE_{Target}}\right) \times 100$$

In some instances, the actual conversion efficiency value is an estimated value or the actual conversion efficiency value may be based on a measured value of $NO_x$ by a $NO_x$ sensor upstream of the SCR catalyst and a $NO_x$ sensor downstream of at least a portion of the SCR catalyst. In some implementations, the predetermined threshold value is a value based on empirical data where 95% of SCR catalysts have failed above the threshold value. In some implementations, indicating the failure of the SCR catalyst includes lighting a malfunction indicator lamp. In some implementations, indicating the failure of the SCR catalyst includes setting a value for a parameter to a value indicating that the SCR catalyst has failed.

Another implementation relates to a controller that includes an ANR circuit configured to determine an ANR value for an exhaust system including an SCR catalyst, a $deNO_x$ conversion inefficiency circuit configured to calculate a conversion inefficiency value based on an actual conversion efficiency for the SCR catalyst and an estimated target conversion efficiency for the SCR catalyst, a $NH_3$ slip circuit configured to determine an $NH_3$ slip value for the exhaust system, and an ACN circuit. The ACN circuit is configured to receive the $NH_3$ slip value from the $NH_3$ slip circuit, the ANR value from the ANR circuit, and the conversion inefficiency value from the $deNO_x$ conversion inefficiency circuit. The ACN circuit is also configured to determine an ACN value based on the $NH_3$ slip value, the ANR value, and the conversion inefficiency value and compare the determined ACN value to a predetermined threshold value. The ACN circuit is further configured to indicate a failure of the SCR catalyst responsive to the determined ACN value exceeding a predetermined threshold value.

In some implementations, the $NH_3$ slip value is based on a detected amount of $NH_3$ slip by a $NH_3$ sensor. In some implementations, the ANR value is a filtered value of an ANR parameter determined based on a feedback control algorithm. In some implementations, the ANR value is based on a detected amount of $NH_3$ by the $NH_3$ sensor or a detected amount of $NO_x$ by the $NO_x$ sensor. In some implementations, the actual conversion efficiency value is an estimated value. In some implementations, the actual conversion efficiency value is based on a measured value of $NO_x$ by a $NO_x$ sensor upstream of the SCR catalyst and a $NO_x$ sensor downstream of at least a portion of the SCR catalyst. In some implementations, indicating the failure of the SCR catalyst includes lighting a malfunction indicator lamp. In some implementations, indicating the failure of the SCR catalyst includes setting a value for a parameter to a value indicating that the SCR catalyst has failed.

Yet a further implementation relates to a method for indicating a failure of an SCR catalyst of an exhaust system. The method includes acquiring an ANR value for exhaust gas flowing through the exhaust system, acquiring a conversion inefficiency value indicative of a conversion inefficiency of the SCR catalyst, acquiring an $NH_3$ slip value indicative of an amount of $NH_3$ slip through the exhaust system downstream of the SCR catalyst, calculating an ACN value based on the acquired ANR value, the acquired conversion inefficiency value, and the acquired $NH_3$ slip value, and indicating a failure of the SCR catalyst responsive to the calculated ACN value exceeding a predetermined threshold value.

In some implementations, the $NH_3$ slip value is based on a detected amount of $NH_3$ slip by a $NH_3$ sensor. In some implementations, the ANR value is based on a detected amount of $NH_3$ by the $NH_3$ sensor or a detected amount of $NO_x$ by the $NO_x$ sensor. In some implementations, the conversion inefficiency value is based on an actual conversion efficiency value and an estimated target conversion efficiency value, where the actual conversion efficiency value is based on a measured value of $NO_x$ by a $NO_x$ sensor upstream of the SCR catalyst and a $NO_x$ sensor downstream of at least a portion of the SCR catalyst. In some implementations, indicating the failure of the SCR catalyst comprises lighting a malfunction indicator lamp or setting a value for a parameter to a value indicating that the SCR catalyst has failed.

BRIEF DESCRIPTION

The details of one or more implementations are set forth in the accompanying drawings and the description below. Other features, aspects, and advantages of the disclosure will become apparent from the description, the drawings, and the claims, in which:

Figure 1:
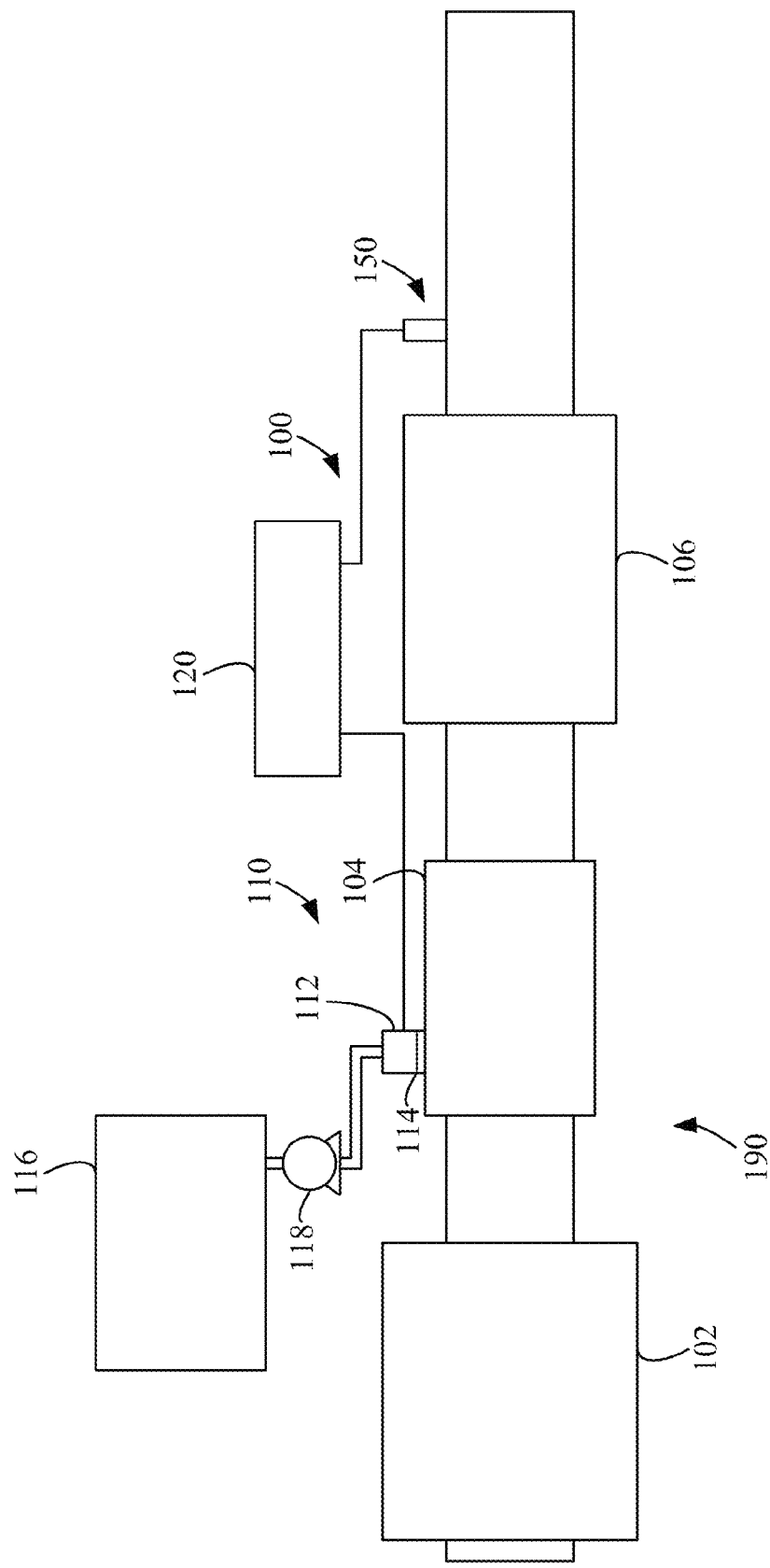
FIG. 1 is a block schematic diagram of an example selective catalytic reduction system having an example reductant delivery system for an exhaust system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for detecting the failure of an SCR catalyst. The various concepts introduced above and discussed in greater detail below may be implemented in any of numerous ways, as the described concepts are not limited to any particular manner of implementation. Examples of specific implementations and applications are provided primarily for illustrative purposes.

I. Overview

For applications that utilize diesel engines (e.g., vehicles, power generators, etc.), an SCR process may be employed to reduce unwanted $NO_x$ compounds from the exhaust gas prior to emission to atmosphere. The SCR process utilizes an SCR catalyst with dosed reductant, such as ammonia, to reduce the $NO_x$ compounds into neutral compounds, such as diatomic nitrogen, water, or carbon dioxide. The SCR catalyst provides a carrier (e.g., a ceramic material) and oxides or base metals, zeolites, and/or other precious metals as active components to assist in the reduction of the $NO_x$ compounds. If the SCR catalyst degrades, such as due to aging, deactivation, etc., or otherwise fails, then increased amounts of $NO_x$ compounds may be released in the emissions from the system. Thus, detection of when an SCR catalyst fails may be important to reduce the likelihood of $NO_x$ compounds being emitted from the system. Moreover, while the use of a single signal or signature may be used for detecting the failure of the catalyst, such a single signal or signature may result in false-positives indicating an SCR catalyst has failed when it is still viable. Such false-positives may result from sensor failures and/or errors. In addition, the false-positives may result in an SCR catalyst being unnecessarily discarded and/or removed and tested while the catalyst is still operable.

Accordingly, to increase the robustness of the testing for the failure of the SCR catalyst and/or to reduce potential false-positives for failed SCR catalysts, multiple parameters or signatures may be used to generate a composite value indicative of the operating status of the SCR catalyst. For instance, three parameters or signatures may be used, including ANR, a $deNO_x$ conversion inefficiency, and a $NH_3$ slip indicator. Each value for the ANR, $deNO_x$ conversion inefficiency, and $NH_3$ slip indicator can be multiplied together to form an aggregate value, such as an ACN value, that can be used to indicate when the SCR catalyst has failed. When the ACN value exceeds a predetermined threshold value, the SCR catalyst can be determined to have likely failed. The use of the multiple parameters or signatures for the ACN value decreases the likelihood that an outlier value for a parameter or signature will trigger the indication that the SCR catalyst has failed.

II. Overview of Aftertreatment System

FIG. 1 depicts an aftertreatment system 100 having an example reductant delivery system 110 for an exhaust system 190. The aftertreatment system 100 includes a diesel particulate filter (DPF) 102, the reductant delivery system 110, a decomposition chamber or reactor 104, a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea, aqueous ammonia, or diesel exhaust fluid (DEF), into ammonia. The decomposition chamber 104 includes a reductant delivery system 110 having a dosing module 112 configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 to which the dosing module 112 is mounted. The dosing module 112 is fluidly coupled to one or more reductant sources 116. In some implementations, a pump 118 may be used to pressurize the reductant from the reductant source 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may also be electrically coupled to a warning lamp, such as a malfunction indicator lamp (MIL), and/or communicatively coupled to a storage device to modify a value of one or more parameters stored in the storage device.

The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

The exhaust system 190 may further include a diesel oxidation catalyst (DOC) in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber or reactor pipe 104. For instance, the DPF 102 and the SCR catalyst 106 may be combined into a single unit, such as an SDPF. In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit, such as a sample pipe extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensor 150 may be utilized for detecting a condition of the exhaust gas, such as two, three, four, five, or size sensor 150 with each sensor 150 located at one of the foregoing positions of the exhaust system 190.

III. Implementations of Systems and Methods for Catalyst Failure Detection

Figure 2:
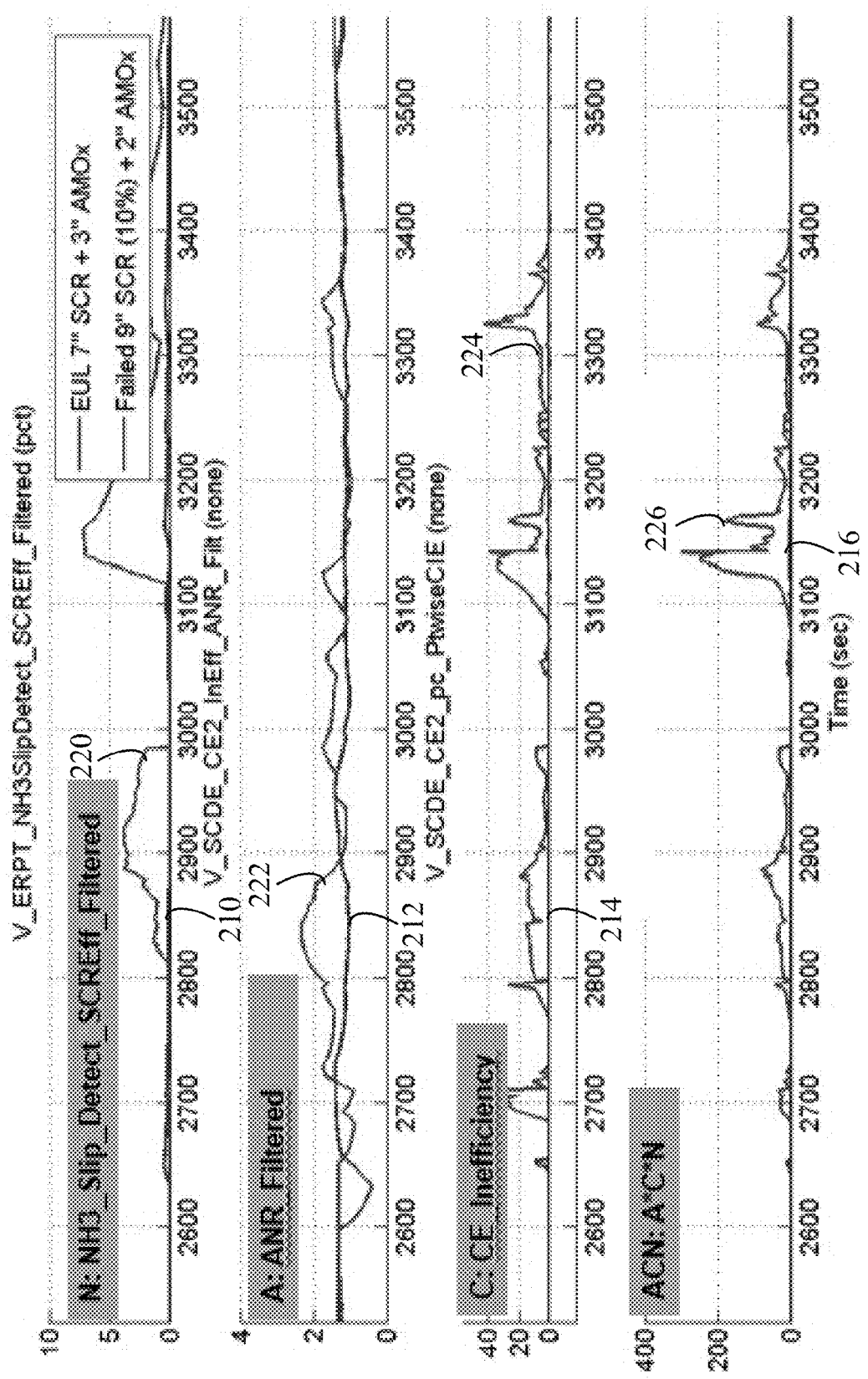
FIG. 2 is a graphical diagram of values for an $NH_3$ slip indicator, ANR, $deNO_x$ conversion inefficiency, and ACN for an operational SCR catalyst and a failed SCR catalyst.

FIG. 2 depicts a graphical diagram 200 of values for an $NH_3$ slip indicator 210, 220, ANR 212, 222, $deNO_x$ conversion inefficiency 214, 224, and ACN 216, 226 for an operational SCR catalyst (210, 212, 214, 216) and a failed SCR catalyst (220, 222, 224, 226). In some implementations, the values can be acquired during a federal testing procedure (FTP) cycle, a ramped modal cycle supplemental emissions test (RMCSET), or any other period of time during engine operations.

As shown in FIG. 2, when an SCR catalyst is operating normally and has not failed, the value for a $NH_3$ slip indicator 210 remains at a low value. When the SCR catalyst has failed, such as due to reduced or ceased operation, then the $NH_3$ slip indicator 220 may increase during operation due to $NH_3$ flowing downstream of the SCR catalyst without reducing $NO_x$ compounds. In some implementations, the $NH_3$ slip may be measured by one or more sensors, such as sensor 150 of FIG. 1, downstream of at least a portion of the SCR catalyst. In some instances, two $NH_3$ sensors may be provided in the exhaust system. In some instances, the $NH_3$ slip may increase simply because the SCR catalyst has failed and the $NH_3$ in the exhaust system has not reduced the $NO_x$ compounds in the exhaust gas when the $NH_3$ sensor measures the $NH_3$ concentration within the exhaust gas. In some cases, the $NH_3$ slip may increase due a $NO_x$ sensor detecting $NO_x$ compounds downstream of at least a portion of the SCR catalyst and a controller, such as controller 120 of FIG. 1, increasing an amount of ammonia dosed responsive to the increased detected $NO_x$. The increased amount of dosed ammonia may result in increased $NH_3$ slip due to the reduced operation or failure of the SCR catalyst.

As shown in FIG. 2, when an SCR catalyst is operating normally and has not failed, the value for ANR 212 remains near a constant value. When the SCR catalyst has failed, such as due to reduced or ceased operation, then the ANR value 222 may increase or fluctuate during operation. The value for the ANR is a filtered value of an ANR parameter from a controller, such as controller 120 of FIG. 1. The ANR parameter may be a ANR command value that is determined based on a feedback control algorithm of the controller. In some implementations, the value for the ANR is indicated as by a parameter, such as parameter A. The filtered ANR value is a value indicative of a ratio of ammonia to $NO_x$ compounds present within the exhaust system. The ANR value may be a value upstream or downstream of the SCR catalyst. If the ANR value is high, then the SCR catalyst may have failed. The high value for ANR may be a result of a downstream $NO_x$ sensor detecting a high $NO_x$ concentration downstream of at least a portion of the SCR catalyst, such as due to reduced or ceased operation of the SCR catalyst, and the controller increasing an ANR commanded value to increase dosing of reductant (e.g., to produce ammonia) into the exhaust system upstream of the SCR catalyst. Because the SCR catalyst has reduced or ceased operation in assisting in the reduction of $NO_x$ compounds, the increase in a commanded value for ANR can indicate such a failure. In some implementations, the ANR value may be a measured ANR value.

Conversion inefficiency, C, is also used in calculating the ACN value. The conversion inefficiency can be calculated by the following:

$$C = \left(1 - \frac{CE}{CE_{Target}}\right) \times 100$$

where CE is an estimation of the actual system conversion efficiency and $CE_{Target}$ is the estimated target conversion efficiency for the SCR catalyst. The estimation of the actual system conversion efficiency can be based on a feedforward algorithm using engine operating parameters, environmental condition parameters, etc. The estimation of the target conversion efficiency for the SCR catalyst may also be based on a feedforward algorithm using engine operating parameters, environmental condition parameters, etc. When an SCR catalyst is operating normally and has not failed, the value for conversion inefficiency 214 remains near a constant low value, indicating that the conversion efficiency is generally at the target conversion efficiency for the given engine operating parameters, environmental condition parameters, etc. When the SCR catalyst has failed, such as due to reduced or ceased operation, then the conversion inefficiency 224 may increase during operation due to the estimated actual conversion efficiency being less than the estimated target conversion efficiency. The estimated actual conversion efficiency and the estimated target conversion efficiency may be parameter values determined based on a control algorithm of the controller.

The three signals—the $NH_3$ slip indicator 210, 220, ammonia to $NO_x$ ratio (ANR) 212, 222, and $deNO_x$ conversion inefficiency 214, 224—can be multiplied together to generate a new value of ACN 216, 226. That is, ACN=A× C×N. In some implementations, enablement conditions must be satisfied before the $NH_3$ slip indicator value, ANR value, and $deNO_x$ conversion inefficiency value are determined to generate a new ACN value. For instance, the enablement conditions may include an SCR bed temperature being within a predetermined range or above a predetermined threshold value (e.g., between 180° C. and 500° C. and/or above 180° C.), an exhaust flow rate being within a predetermined range or above a predetermined threshold value, an ANR value being within a predetermined range or above a predetermined threshold value, etc. If the enablement conditions are met, then the controller can acquire the $NH_3$ slip indicator value, ANR value, and $deNO_x$ conversion inefficiency value to generate the ACN value.

Figure 3:
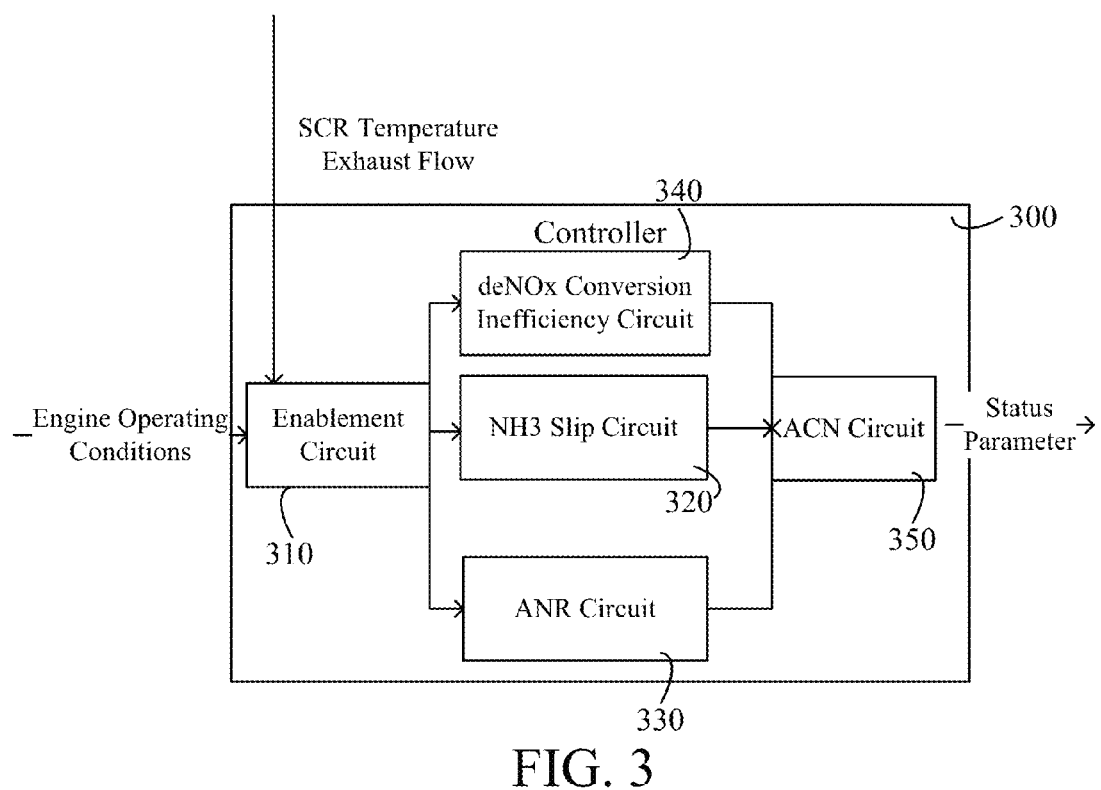
FIG. 3 is a block diagram of a controller having an SCR failure detection circuit.
Figure 4:
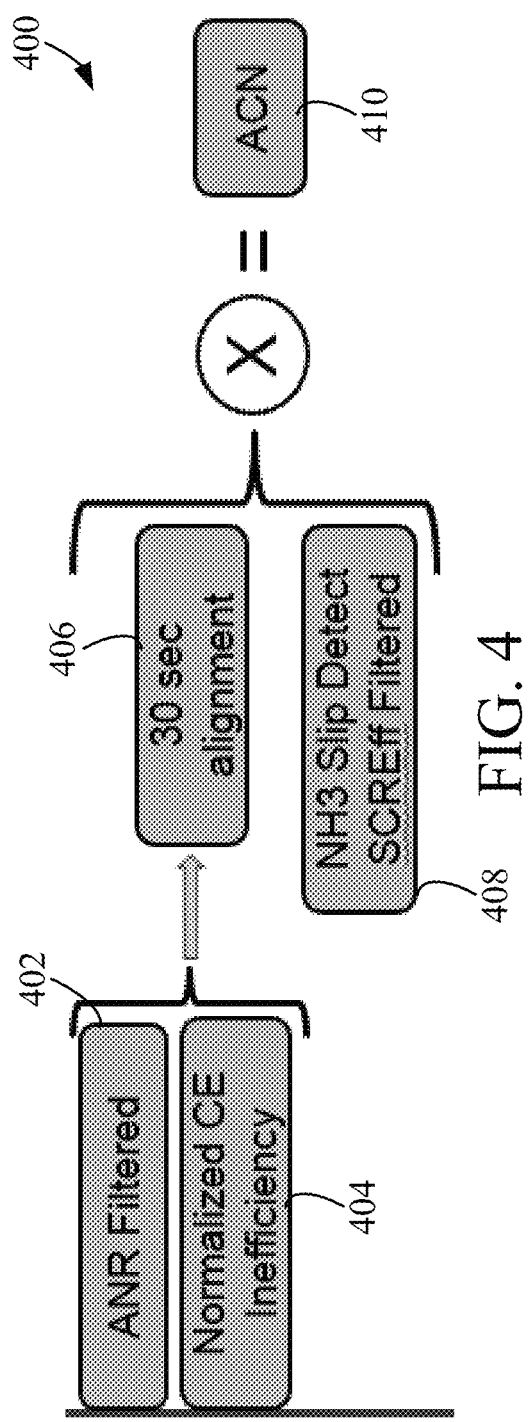
FIG. 4 is a flow diagram of a process to calculate an ACN value based on the $NH_3$ slip indicator, ANR, and $deNO_x$ conversion inefficiency values.

FIG. 3 depicts an implementation of a controller 300, such as the controller 120 of FIG. 1, having an enablement circuit 310, an $NH_3$ slip circuit 320, an ANR circuit 330, a $deNO_x$ conversion inefficiency circuit 340, and an ACN circuit 350. The enablement circuit 310 is configured to determine if one or more enablement conditions are met. Determining whether the enablement conditions are met may include acquiring (e.g., via accessing, identifying, receiving, and/or determining) one or more values for parameters indicative of one or more operating conditions. For instance, the enablement conditions may include an SCR bed temperature being within a predetermined range or above a predetermined threshold value (e.g., between 180° C. and 500° C. and/or above 180° C.), an exhaust flow rate being within a predetermined range or above a predetermined threshold value (e.g., above a predetermined cfm), an ANR value being within a predetermined range or above a predetermined threshold value (e.g., an ANR value between 0.5 and 1.05 and/or below 1.0), etc. The enablement circuit 310 may receive one or more engine operating conditions to be used to calculate one or more values, such as an ANR value based on the engine operating conditions. In some implementations, the enablement circuit 310 may also receive an SCR bed temperature value from a temperature sensor and/or as a parameter from a feed-forward calculation. The enablement circuit 310 may further receive the exhaust flow rate value from a flow sensor and/or as a parameter from a feed-forward calculation. If the enablement conditions are met by the enablement circuit 310 determination, then the controller 300 may activate the $NH_3$ slip circuit 320, the ANR circuit 330, the $deNO_x$ conversion inefficiency circuit 340, and the ACN circuit 350.

In one embodiment, the enablement circuit 310 may include or be communicably coupled with one or more sensors and/or other circuits of the controller 300 for receiving one or more values indicative of engine operating conditions. For instance, the enablement circuit 310 may be coupled to an engine speed sensor for receiving a value indicative of the speed of the engine, a fuel flow rate sensor for receiving a value indicative of the fuel flow rate to the engine, an air flow rate sensor for receiving a value indicative of an air flow rate, an air temperature sensor for receiving a value indicative of an air temperature, etc. In some implementations, the enablement circuit 310 may be communicatively coupled to one or more other circuits of the controller 300 to receive engine operating conditions, such as a feedforward circuit for determining one or more engine operating conditions. In another embodiment, the enablement circuit 310 may include communication circuitry including, but not limited to, wired and wireless communication protocol to facilitate reception of the one or more values. In still another embodiment, the enablement circuit 310 may include machine-readable media stored by the memory and executable by the processor, wherein the machine-readable media facilitates performance of certain operations to receive the values indicative of the engine operating conditions. For example, the machine-readable media may provide an instruction (e.g., command, etc.) to one or more sensors operatively coupled to the engine to monitor and acquire data. In this regard, the machine-readable media may include programmable logic that defines the frequency of acquisition of the data of the sensors. In yet another embodiment, the enablement circuit 310 may include any combination of machine-readable content, communication circuitry, and the one or more sensors.

The NH$_3$ slip circuit 320 calculates and/or determines the NH$_3$ slip. In some implementations, the NH$_3$ slip may be measured by one or more sensors, such as the sensor 150 of FIG. 1, positioned relative to the exhaust system to detect an amount of NH$_3$ slip downstream of at least a portion of the SCR catalyst. In some instances, two NH$_3$ sensors may be provided in the exhaust system. In other implementations, the NH$_3$ slip may be determined by the NH$_3$ slip circuit 320 through a feed-forward calculation based on the engine operating conditions.

In one embodiment, the NH$_3$ slip circuit 320 may include or be communicably coupled with the one or more sensors and/or other circuits of the controller 300 for receiving one or more values indicative of a measured NH$_3$ amount in the exhaust system. In some implementations, the NH$_3$ slip circuit 320 may be communicatively coupled to one or more other circuits of the controller 300 to receive values indicative of NH$_3$ amounts, such as a feedforward circuit for determining the NH$_3$ slip amount. In another embodiment, the NH$_3$ slip circuit 320 may include communication circuitry including, but not limited to, wired and wireless communication protocol to facilitate reception of the one or more values. In still another embodiment, the NH$_3$ slip circuit 320 may include machine-readable media stored by the memory and executable by the processor, wherein the machine-readable media facilitates performance of certain operations to receive the values indicative of the NH$_3$ slip amount. For example, the machine-readable media may provide an instruction (e.g., command, etc.) to one or more NH$_3$ sensors operatively coupled to the exhaust system to monitor and acquire data. In this regard, the machine-readable media may include programmable logic that defines the frequency of acquisition of the data of the sensors. In yet another embodiment, the NH$_3$ slip circuit 320 may include any combination of machine-readable content, communication circuitry, and the one or more sensors.

The ANR circuit 330 calculates and/or determines the ANR. In some implementations, the value for the ANR is a filtered value of an ANR parameter used by the controller 300 for controlling dosing of reductant. The ANR parameter may be a ANR command value that is determined based on a feedback control algorithm of the controller. The ANR value may be a value upstream or downstream of the SCR catalyst. In other implementations, the ANR value may be measured by one or more sensors upstream and/or downstream of at least a portion of the SCR catalyst. In some instances, NH$_3$ and/or NO$_x$ sensors may be provided in the exhaust system to be used in the calculation of the ANR value. In other implementations, the ANR value may be determined by the ANR circuit 330 through a feed-forward calculation based on the engine operating conditions.

In one embodiment, the ANR circuit 330 may include or be communicably coupled with the one or more sensors and/or other circuits of the controller 300 for receiving one or more values to determine the ANR in the exhaust system. In some implementations, the ANR circuit 330 may be communicatively coupled to one or more other circuits of the controller 300 to receive values indicative of ANR amount, such as a feedforward circuit for determining the ANR amount. In another embodiment, the ANR circuit 330 may include communication circuitry including, but not limited to, wired and wireless communication protocol to facilitate reception of the one or more values. In still another embodiment, the ANR circuit 330 may include machine-readable media stored by the memory and executable by the processor, wherein the machine-readable media facilitates performance of certain operations to receive the values indicative of the ANR amount. For example, the machine-readable media may provide an instruction (e.g., command, etc.) to one or more NH$_3$ and/or NO$_x$ sensors operatively coupled to the exhaust system to monitor and acquire data. In this regard, the machine-readable media may include programmable logic that defines the frequency of acquisition of the data of the sensors. In yet another embodiment, the ANR circuit 330 may include any combination of machine-readable content, communication circuitry, and the one or more sensors.

The deNO$_x$ conversion inefficiency circuit 340 calculates the deNO$_x$ conversion inefficiency of the system. The conversion inefficiency calculated by the deNO$_x$ conversion inefficiency circuit 340 by:

$$C = \left(1 - \frac{CE}{CE_{Target}}\right) \times 100$$

where CE is an estimation of the actual system conversion efficiency and CE$_{Target}$ is the estimated target conversion efficiency for the SCR catalyst. The estimation of the actual system conversion efficiency can be based on a feedforward algorithm using engine operating parameters, environmental condition parameters, etc. The estimation of the target conversion efficiency for the SCR catalyst may also be based on a feedforward algorithm using engine operating parameters, environmental condition parameters, etc. In other implementations, the conversion efficiency, CE, may be based on a measured value of NO$_x$ by a NO$_x$ sensor upstream and a NO$_x$ sensor downstream of at least a portion of the SCR catalyst.

In one embodiment, the deNO$_x$ conversion inefficiency circuit 340 may include or be communicably coupled with the one or more sensors and/or other circuits of the controller 300 for receiving one or more values to determine the deNO$_x$ conversion inefficiency of the exhaust system. In some implementations, the deNO$_x$ conversion inefficiency circuit 340 may be communicatively coupled to one or more other circuits of the controller 300 to receive values indicative of the estimated actual system conversion efficiency and the estimated target conversion efficiency, such as a feedforward circuit for determining the estimated actual system conversion efficiency and estimated target conversion efficiency. In another embodiment, the deNO$_x$ conversion inefficiency circuit 340 may include communication circuitry including, but not limited to, wired and wireless communication protocol to facilitate reception of the one or more values. In still another embodiment, the deNO$_x$ conversion inefficiency circuit 340 may include machine-readable media stored by the memory and executable by the processor, wherein the machine-readable media facilitates performance of certain operations to receive the values indicative of the actual system conversion efficiency and target conversion efficiency. For example, the machine-readable media may provide an instruction (e.g., command, etc.) to one or more NO$_x$ sensors operatively coupled to the exhaust system to monitor and acquire data. In this regard, the machine-readable media may include programmable logic that defines the frequency of acquisition of the data of the sensors. In yet another embodiment, the deNO$_x$ conversion inefficiency circuit 340 may include any combination of machine-readable content, communication circuitry, and the one or more sensors.

The ACN circuit 350 receives the $NH_3$ slip value from the $NH_3$ slip circuit 320, the ANR value from the ANR circuit 330, and the $deNO_x$ conversion inefficiency value from the $deNO_x$ conversion inefficiency circuit 340. The ANR circuit 350 multiplies the $NH_3$ slip value, ANR value, and $deNO_x$ conversion inefficiency value to determine an ACN value. The ACN circuit 350 then compares the ACN value to a predetermined threshold value, such as a threshold value of 50, 100, 200, etc. The predetermined threshold value may be based on empirical data such that a threshold value where 95% of catalysts have failed above the threshold value. If the ACN value determined by the ACN circuit 350 is below the predetermined threshold value, then the ACN circuit 350 can set and/or reset a flag value or status parameter value indicative of no failure of the SCR catalyst. In some implementations, the flag value and/or parameter value may be used by a timer or other component of the controller to delay the enablement circuit 310 from activating for a predetermined period of time (e.g., 1 hour, 2 hours, 4 hours, 6 hours, 12 hours, 24 hours, etc.). If the ACN value determined by the ACN circuit 350 is above the predetermined threshold value, then the ACN circuit 350 can set a flag value or status parameter value indicative of a failure of the SCR catalyst. Responsive to the flag value or parameter value indicating a failure of the SCR catalyst, a warning lamp may be lit, such as a malfunction indicator lamp (MIL), and/or other indicators of the failure of the SCR catalyst may be utilized.

FIG. 3 depicts an implementation of a process 400 for detecting the failure of an SCR catalyst that may be implemented by the controller 300 of FIG. 3. In the implementation shown, the process 400 includes acquiring the ANR value 402 and the normalized conversion inefficiency value 404. The ANR value 402 can be acquired by the ANR circuit 320 of the controller 300 after the enablement conditions are met as determined by the enablement circuit 310. Similarly, the normalized conversion inefficiency value 404 can be acquired by the $deNO_x$ conversion inefficiency circuit 340 of the controller 300 after the enablement conditions are met as determined by the enablement circuit 310. The process 400 further includes a delay or alignment 430 for the ANR value 402 and the normalized conversion inefficiency value 404 to be delayed for a predetermined period of time, such as a thirty second delay. The delay or alignment 430 may be provided based on a timer delaying transmittal of the ANR value 402 and the normalized conversion inefficiency value 404. The process 400 further includes an $NH_3$ slip value 408 that can be acquired using the $NH_3$ slip circuit 320. The $NH_3$ slip value 408, the delayed ANV value 402, and the delayed normalized conversion inefficiency value 404 are then combined, such as via multiplication, to result in an ACN value 410. In other implementations, a delay for one or more enablement conditions to acquire the $NH_3$ slip value 408 may be used instead of the delay or alignment 430.

Figure 5:
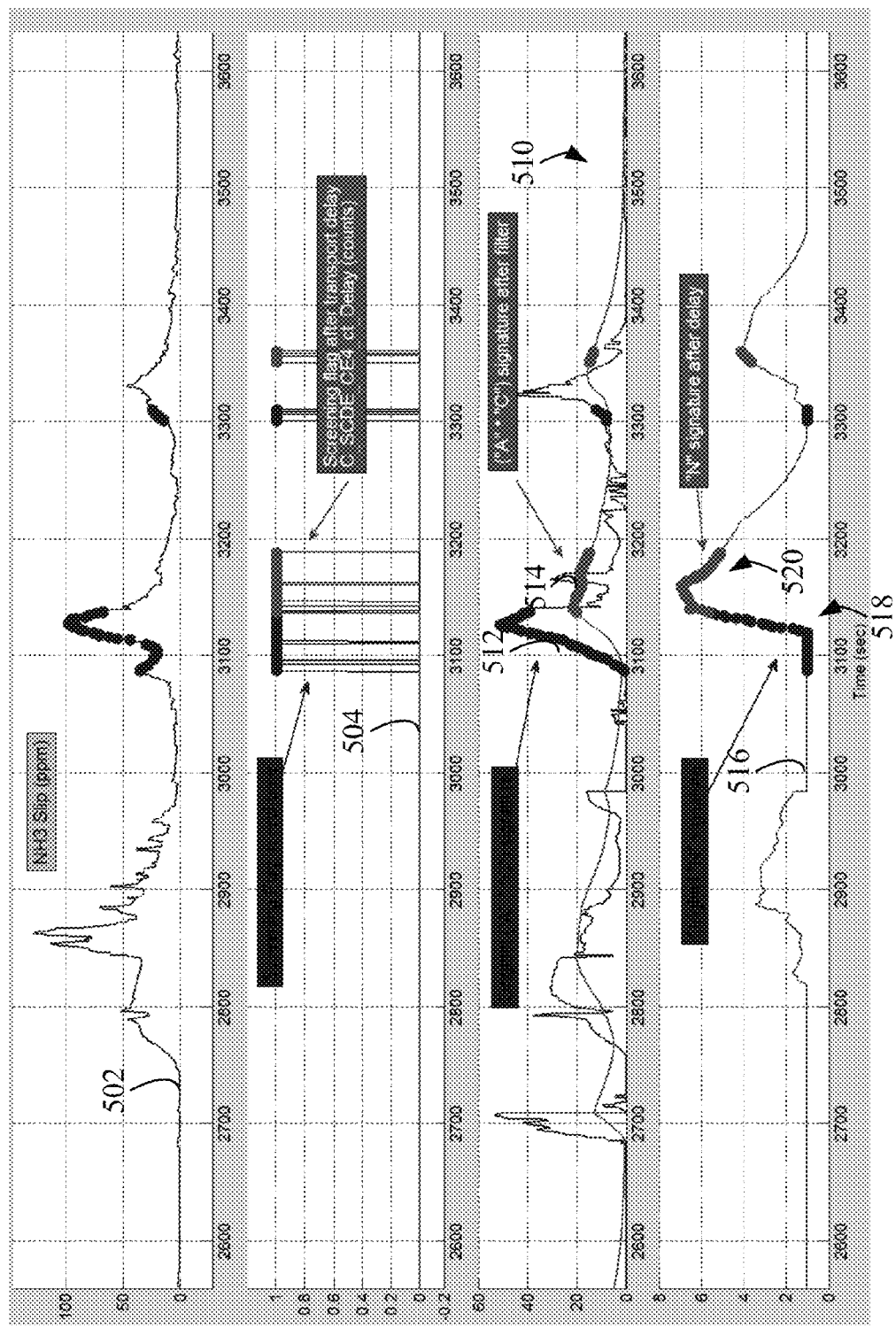
FIG. 5 is a graphical diagram of values for an $NH_3$ slip indicator, screening delay flag, combined ANR and $deNO_x$ conversion inefficiency, and ACN highlighting values before and after a transport delay.

FIG. 5 depicts graphical plot examples showing an ACN value 502 over a period of time, a screening delay flag value 504 over the period of time, the combined ANR value and normalized conversion inefficiency value 510 over the period of time, and the $NH_3$ slip value 516 over the period of time.

The combined ANR value and normalized conversion inefficiency value 510 are shown both as originally calculated 512 and when a delay 514, such as a thirty second delay, is applied. The combined ANR value and normalized conversion inefficiency value 510 may be the value received and/or used by the ANR circuit 330 and the $deNO_x$ conversion inefficiency circuit 340. The ANR value and normalized conversion inefficiency value may be based on a feedforward calculation or may be based on a reading from one or more sensors. The screening flag value 504 represents a flag value indicative of when the enablement conditions have been met. A first set of screening flag values are shown as occurring without a delay and a second set of screening flag values are shown with a delay, such as the thirty second delay, is applied. As shown in the Figure, the $NH_3$ slip value 516 includes a first region 518 of values where the enablement conditions have been met, but without any delay, and a second region 520 where the enablement conditions have been met with the delay applied. The $NH_3$ slip value 516 may be the value received and/or used by the $NH_3$ slip circuit 320. The $NH_3$ slip value 516 may be based on a feedforward calculation to determine the $NH_3$ slip amount or the $NH_3$ slip value 516 may be based on a reading from an $NH_3$ sensor.

Figure 6:
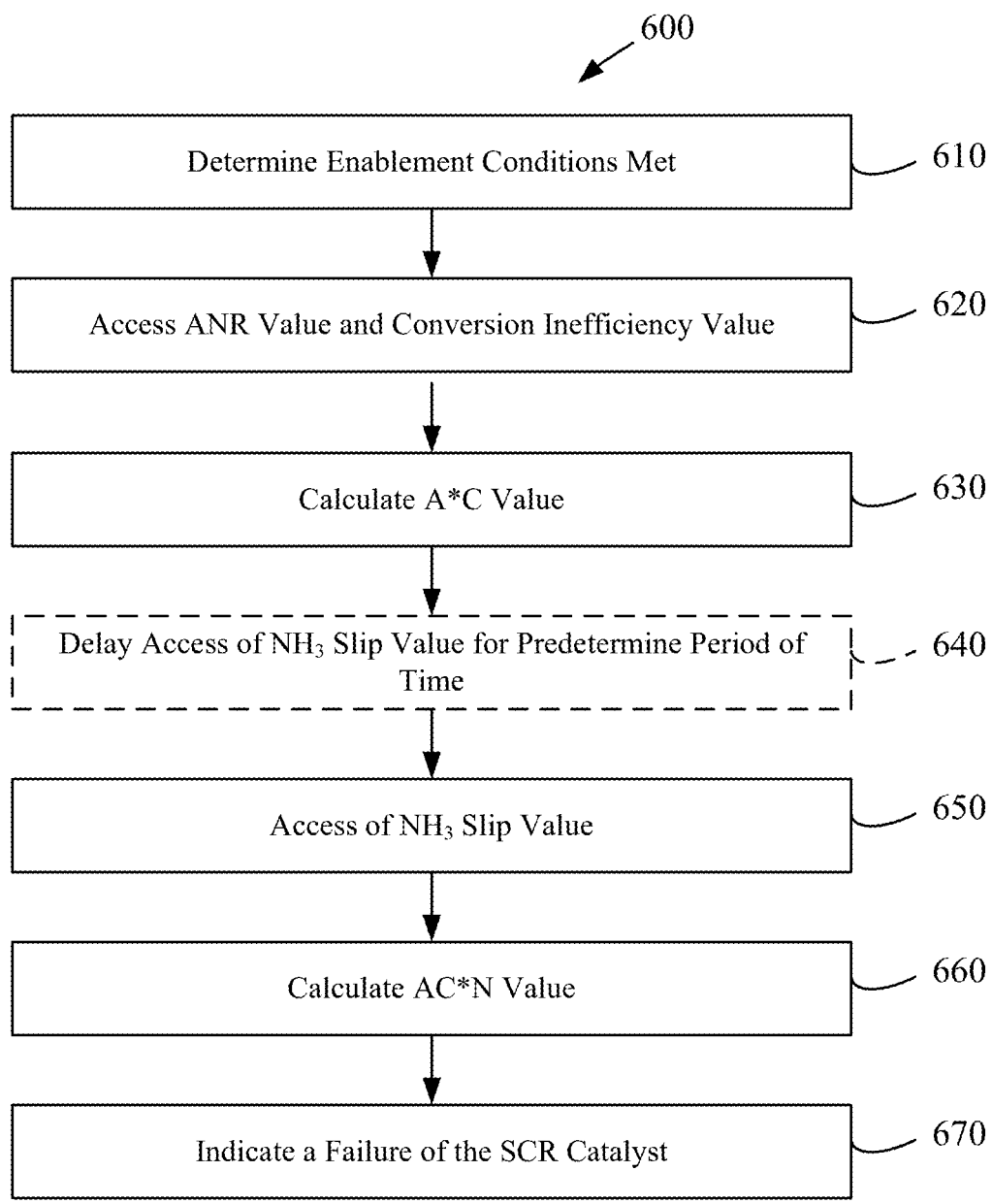
FIG. 6 is a process diagram for determining and indicating that an SCR catalyst has failed.

FIG. 6 depicts an implementation of a process 600 for detecting and indicating a failure of an SCR catalyst using the ACN value. The process 600 includes determining that enablement conditions are met (block 610). Determining whether the enablement conditions are met may include acquiring (e.g., accessing, identifying, receiving, and/or determining) one or more values for parameters indicative of one or more operating conditions. For instance, the enablement conditions may include an SCR bed temperature being within a predetermined range or above a predetermined threshold value (e.g., between 180° C. and 500° C. and/or above 180° C.), an exhaust flow rate being within a predetermined range or above a predetermined threshold value (e.g., above a predetermined cfm), an ANR value being within a predetermined range or above a predetermined threshold value (e.g., an ANR value between 0.5 and 1.05 and/or below 1.0), etc. The determination of if the enablement conditions are met may be performed by the enablement circuit 310 of FIG. 3. If the enablement conditions are not met, then the process 600 may end.

If the enablement conditions are met, then the process 600 includes acquiring an ANR value and a conversion inefficiency value (block 620). In some implementations, the ANR value may be acquired by reading a value of an ANR parameter that is determined based on a feedback control algorithm of the controller. The ANR value may be a value upstream or downstream of the SCR catalyst. In other implementations, the ANR value may be measured by one or more sensors upstream and/or downstream of at least a portion of the SCR catalyst. In some instances, $NH_3$ and/or $NO_x$ sensors may be provided in the exhaust system to be used in the calculation of the ANR value. In other implementations, the ANR value may be determined by the ANR circuit 330 through a feed-forward calculation based on the engine operating conditions. The conversion inefficiency value can be acquired by reading a value of a $deNO_x$ conversion inefficiency parameter that is determined by the controller. The conversion inefficiency is calculated by:

$$C = \left(1 - \frac{CE}{CE_{Target}}\right) \times 100$$

where CE is an estimation of the actual system conversion efficiency and $CE_{Target}$ is the estimated target conversion efficiency for the SCR catalyst. The estimation of the actual system conversion efficiency can be based on a feedforward algorithm using engine operating parameters, environmental condition parameters, etc. The estimation of the target conversion efficiency for the SCR catalyst may also be based on a feedforward algorithm using engine operating parameters, environmental condition parameters, etc. In other implementations, the conversion efficiency, CE, may be based on a measured value of $NO_x$ by a $NO_x$ sensor upstream and a $NO_x$ sensor downstream of at least a portion of the SCR catalyst.

Based on the acquired ANR value and conversion inefficiency value, the process 600 includes calculating an A×C value (block 630). In some implementations, the process 600 includes delaying access of a $NH_3$ slip value for a predetermined period of time (block 640). In some implementations, the predetermined period of time may be a preset time, such as thirty seconds. In other implementations, the predetermined period of time may be empirically determined for the type of system implementing the process 600 (e.g., for different engine models, different usages, etc). The delaying of access of the $NH_3$ slip value may be based on a timing circuit. In other implementations, acquiring the $NH_3$ slip value may not be delayed.

The process 600 includes acquiring the $NH_3$ slip value (block 650), either after the delay or without the delay. In some implementations, the $NH_3$ slip value may be acquired by accessing a parameter storing a measured value indicative of the $NH_3$ slip by one or more sensors, such as sensor 150 of FIG. 1, downstream of at least a portion of the SCR catalyst. In some instances, two $NH_3$ sensors may be provided in the exhaust system. In other implementations, the $NH_3$ slip value may be acquired by accessing a parameter storing a value determined through a feed-forward calculation based on the engine operating conditions.

The process 600 further includes calculating an ACN value (block 660). The calculated A×C value may be multiplied by the acquired $NH_3$ slip value and/or the acquired ANR value, conversion inefficiency value, and $NH_3$ slip value may be directly multiplied together.

The process 600 further includes indicating a failure of the SCR catalyst (block 670). The failure of the SCR catalyst may be determined based on a comparison of the calculated ACN value to a predetermined threshold value. In some implementations, the predetermined threshold value may be an empirically determined value for a corresponding system. Indicating the failure of the SCR catalyst may include setting a value for a parameter to a value indicating that the SCR catalyst has failed (e.g., setting SCRCatalystFail=1), causing a warning lamp to be lit (e.g., a malfunction indicator lamp (MIL)), and/or other setting any other indicators that the SCR catalyst has failed. In some implementations, other processes may be triggered and/or stopped responsive to determining the SCR catalyst has failed. In some implementations, indicating a failure of the SCR catalyst may be responsive to a predetermined number of calculated CAN values exceeding the predetermined threshold value, such as indicating a failure of the SCR catalyst if 10 calculated CAN values exceed the predetermined threshold value.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, the terms "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system comprising:
   an exhaust system including a selective catalytic reduction (SCR) catalyst; and
   a controller configured to:
      acquire an ammonia to NOx ratio (ANR) value for exhaust gas flowing through the exhaust system;
      acquire a conversion inefficiency value indicative of a conversion inefficiency of the SCR catalyst;
      acquire an $NH_3$ slip value indicative of an amount of $NH_3$ slip through the exhaust system downstream of the SCR catalyst;
      calculate a combined ANR/conversion inefficiency/$NH_3$ slip (ACN) value based on the acquired ANR value, the acquired conversion inefficiency value, and the acquired $NH_3$ slip value; and
      indicate a failure of the SCR catalyst responsive to the calculated ACN value exceeding a predetermined threshold value.

2. The system of claim 1 further comprising an $NH_3$ sensor positioned relative to the exhaust system to detect an amount of $NH_3$ slip downstream of at least a portion of the SCR catalyst, wherein acquiring the $NH_3$ slip value is based on the detected amount of $NH_3$ slip by the $NH_3$ sensor.

3. The system of claim 1, wherein acquiring the ANR value includes acquiring a filtered value of an ANR parameter determined based on a feedback control algorithm of the controller.

4. The system of claim 1, further comprising a $NH_3$ sensor positioned relative to the exhaust system, wherein acquiring the ANR value is based on a detected amount of $NH_3$ by the $NH_3$ sensor.

5. The system of claim 1, further comprising a $NO_x$ sensor positioned relative to the exhaust system, wherein acquiring the ANR value is based on a detected amount of $NO_x$ by the $NO_x$ sensor.

6. The system of claim 1, wherein acquiring the conversion inefficiency value includes acquiring an actual conversion efficiency value for the SCR catalyst and an estimated target conversion efficiency value for the SCR catalyst.

7. The system of claim 6, wherein the conversion inefficiency value is calculated by:

$$C = \left(1 - \frac{CE}{CE_{Target}}\right) \times 100.$$

8. The system of claim 6, wherein the actual conversion efficiency value is an estimated value.

9. The system of claim 6, wherein the actual conversion efficiency value is based on a measured value of $NO_x$ by a $NO_x$ sensor upstream of the SCR catalyst and a $NO_x$ sensor downstream of at least a portion of the SCR catalyst.

10. The system of claim 1, wherein the predetermined threshold value is a value based on empirical data where 95% of SCR catalysts have failed above the threshold value.

11. The system of claim 1, wherein indicating the failure of the SCR catalyst comprises lighting a malfunction indicator lamp.

12. The system of claim 1, wherein indicating the failure of the SCR catalyst comprises setting a value for a parameter to a value indicating that the SCR catalyst has failed.

13. A controller comprising:
   an ammonia to NOx ratio (ANR) circuit configured to determine an ANR value for an exhaust system including a selective catalytic reduction (SCR) catalyst;
   a $deNO_x$ conversion inefficiency circuit configured to calculate a conversion inefficiency value based on an actual conversion efficiency for the SCR catalyst and an estimated target conversion efficiency for the SCR catalyst;
   a $NH_3$ slip circuit configured to determine an $NH_3$ slip value for the exhaust system; and
   a combined ANR/conversion inefficiency/$NH_3$ slip (ACN) circuit configured to:
      receive the $NH_3$ slip value from the $NH_3$ slip circuit, the ANR value from the ANR circuit, and the conversion inefficiency value from the $deNO_x$ conversion inefficiency circuit,
      determine an ACN value based on the $NH_3$ slip value, the ANR value, and the conversion inefficiency value,
      compare the determined ACN value to a predetermined threshold value, and
      indicate a failure of the SCR catalyst responsive to the determined ACN value exceeding a predetermined threshold value.

14. The controller of claim 13, wherein the $NH_3$ slip value is based on a detected amount of $NH_3$ slip by a $NH_3$ sensor.

15. The controller of claim 13, wherein the ANR value is a filtered value of an ANR parameter determined based on a feedback control algorithm.

16. The controller of claim 13, wherein the ANR value is based on a detected amount of $NH_3$ by the $NH_3$ sensor or a detected amount of $NO_x$ by the $NO_x$ sensor.

17. The controller of claim 13, wherein the actual conversion efficiency value is an estimated value.

18. The controller of claim 13, wherein the actual conversion efficiency value is based on a measured value of $NO_x$ by a $NO_x$ sensor upstream of the SCR catalyst and a $NO_x$ sensor downstream of at least a portion of the SCR catalyst.

19. The controller of claim 13, wherein indicating the failure of the SCR catalyst comprises lighting a malfunction indicator lamp.

20. The controller of claim 13, wherein indicating the failure of the SCR catalyst comprises setting a value for a parameter to a value indicating that the SCR catalyst has failed.

21. A method for indicating a failure of a selective catalytic reduction (SCR) catalyst of an exhaust system, the method comprising:
acquiring an ammonia to NOx ratio (ANR) value for exhaust gas flowing through the exhaust system;
acquiring a conversion inefficiency value indicative of a conversion inefficiency of the SCR catalyst;
acquiring an $NH_3$ slip value indicative of an amount of $NH_3$ slip through the exhaust system downstream of the SCR catalyst;
calculating a combined ANR/conversion inefficiency/$NH_3$ slip (ACN) value based on the acquired ANR value, the acquired conversion inefficiency value, and the acquired $NH_3$ slip value; and
indicating a failure of the SCR catalyst responsive to the calculated ACN value exceeding a predetermined threshold value.

22. The method of claim 21, wherein the $NH_3$ slip value is based on a detected amount of $NH_3$ slip by a $NH_3$ sensor.

23. The method of claim 21, wherein the ANR value is based on a detected amount of $NH_3$ by the $NH_3$ sensor or a detected amount of $NO_x$ by the $NO_x$ sensor.

24. The method of claim 21, wherein the conversion inefficiency value is based on an actual conversion efficiency value and an estimated target conversion efficiency value, wherein the actual conversion efficiency value is based on a measured value of $NO_x$ by a $NO_x$ sensor upstream of the SCR catalyst and a $NO_x$ sensor downstream of at least a portion of the SCR catalyst.

25. The method of claim 21, wherein indicating the failure of the SCR catalyst comprises lighting a malfunction indicator lamp or setting a value for a parameter to a value indicating that the SCR catalyst has failed.

* * * * *